United States Patent [19]

Rowe

[11] 4,244,067

[45] Jan. 13, 1981

[54] HAND TOOL FOR WORKING WITH WIRE AND CABLE

[76] Inventor: Richard D. Rowe, 501 N. Virginia, Port Lavaca, Tex. 77979

[21] Appl. No.: 961,332

[22] Filed: Nov. 16, 1978

[51] Int. Cl.³ .......................... B25B 7/22; H02G 1/12
[52] U.S. Cl. ............................................. 7/107; 7/127
[58] Field of Search ................. 7/107, 127; 81/9.5 A, 81/9.5 R

[56] References Cited

U.S. PATENT DOCUMENTS

| 1,393,365 | 10/1921 | Heil | 7/127 X |
| 2,819,633 | 1/1958 | Boehnke | 7/127 X |
| 3,947,905 | 4/1976 | Neff | 7/107 |

*Primary Examiner*—James G. Smith
*Attorney, Agent, or Firm*—Fulbright & Jaworski

[57] ABSTRACT

A hand tool for use with electrical wiring and cable, and more particularly for use with coaxial cable. The tool combines into one tool all the tools normally required when working with electrical wiring and cable; such as tools for cutting, stripping, removing dielectric, pushing on fittings, crimping, decrimping, removing connectors, and tightening and loosening connectors. The tool includes two jaws, both of which contain elements for removing dielectrics and for stripping cable; and two handles, both of which contain elements for crimping and for decrimping, one handle having a wrench-like open end for removing fittings, the other handle having a threaded element with a center hole for connecting and for removing cable.

2 Claims, 8 Drawing Figures

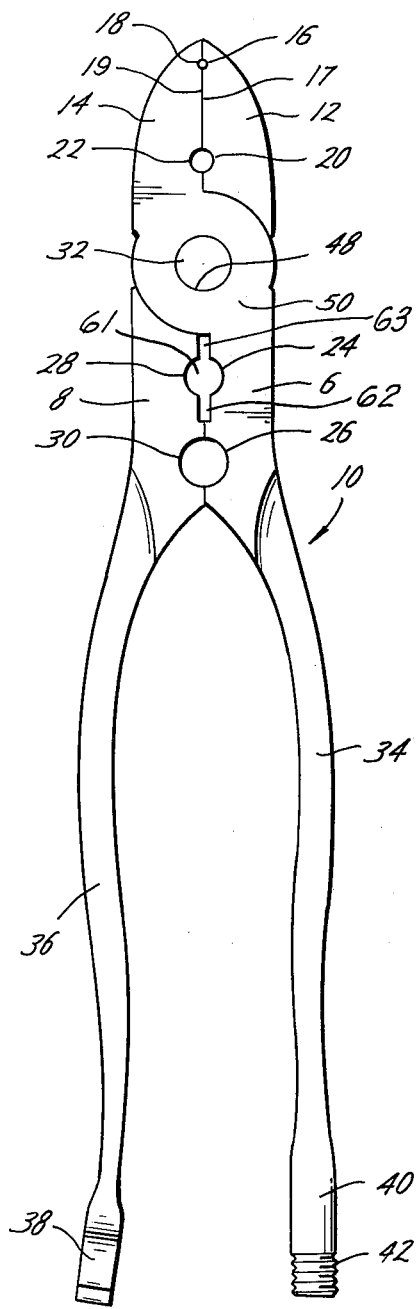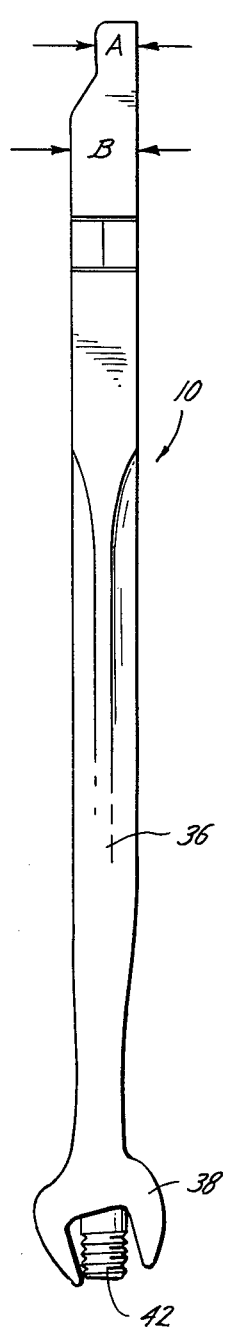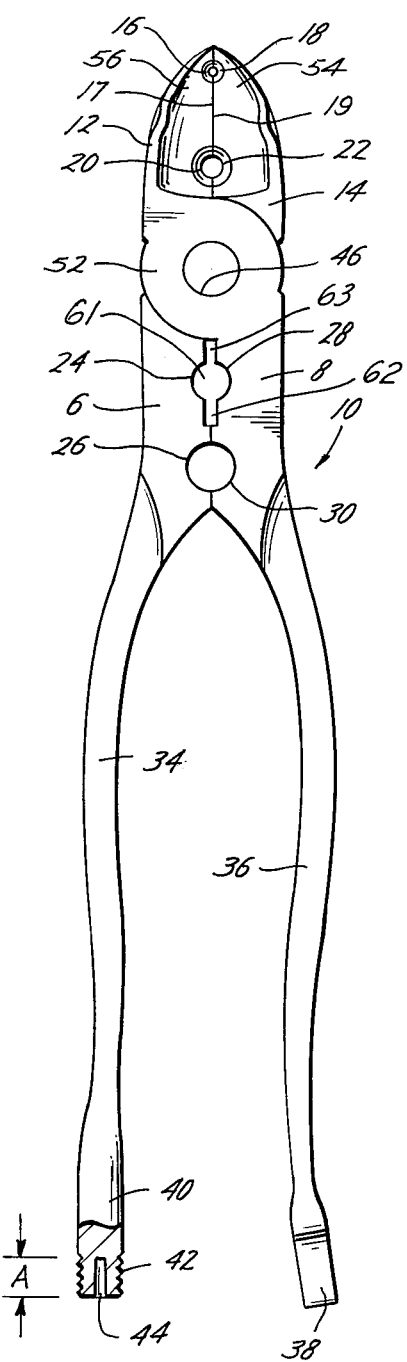

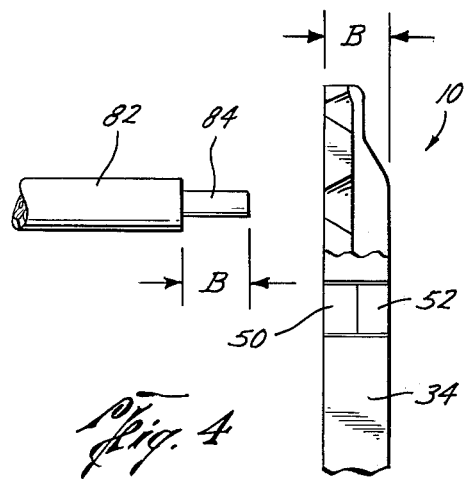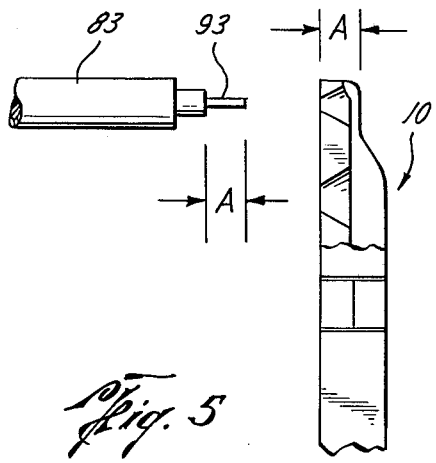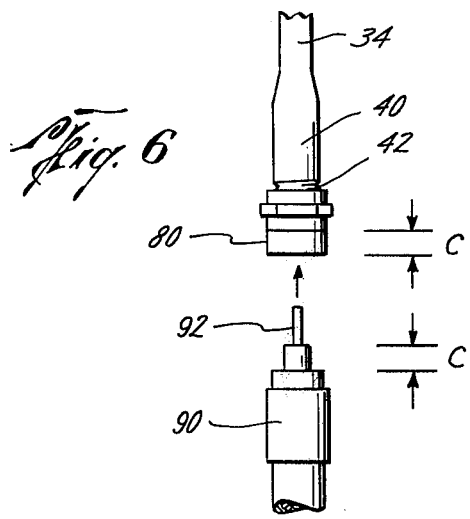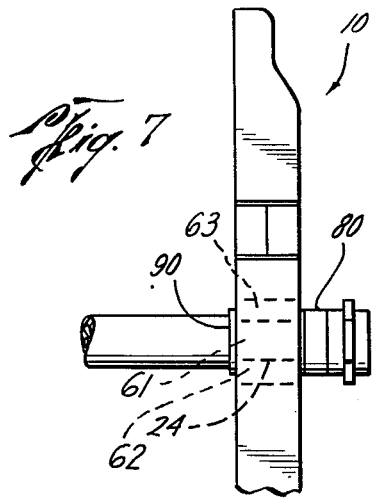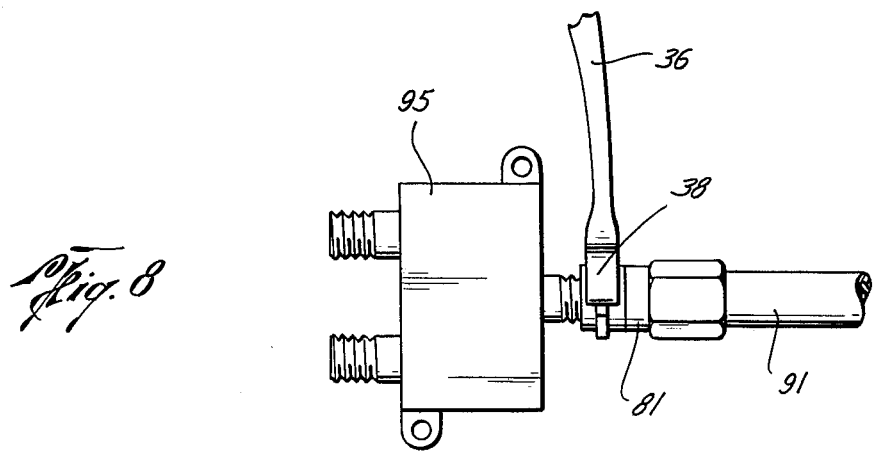

HAND TOOL FOR WORKING WITH WIRE AND CABLE

BACKGROUND OF THE INVENTION

1. Field of the Invention

The present invention relates to hand tools in general, and in particular, to a combination tool for performing a variety of functions when working with electrical wiring and cable. More particularly, this tool can be used effectively and efficiently with coaxial cable.

2. Description of the Prior Art

The prior art discloses various hand tools which perform one or a number of the operations which are commonly performed on electrical wiring and cable; but no device is disclosed in the prior art which performs all of the operations which can be performed by the present invention. U.S. Pat. No. 2,585,080 discloses a wire stripping pliers which can be used to cut, sever, and strip insulation from an insulated wire. U.S. Pat. No. 2,778,255 discloses a tool for stripping the components of a coaxial cable. U.S. Pat. No. 3,109,332 discloses a device for stripping the insulation from wire. U.S. Pat. No. 3,654,647 discloses a combination wire working tool which performs a number of functions on electrical wire. U.S. Pat. No. 3,733,626 discloses a compound tool which includes both a wire stripper and a bolt cutter. U.S. Pat. No. 3,902,206 discloses a pliers for removing insulation from electrical wiring. None of these devices can be used effectively to accomplish all of the tasks which can be performed by the present invention. Also, none of these patents alone or in combination teach or suggest the broad range of operations, characteristics, advantages, and uses inherent in the unique, novel, and improved combination of the present invention.

SUMMARY OF THE INVENTION

The present invention is directed to a tool having characteristics such that it can be used to perform a plurality of operations on electrical wiring and electrical cable. It has unique features which make it particularly useful in working with coaxial cable.

The present invention is generally a plier-like hand tool which includes two members which are pivotally attached to each other. One end of each member is formed into a jaw and each jaw has elements which can be used to sever, remove, and grip insulation, jacketing, and dielectrics. Crimping and decrimping elements are formed in the mid portions of the two members. The end portions of the members opposite from the ends having the jaws serve as lever handles. An open end wrench is formed of the end of one of the handles. The end of the other handle is threaded and has a center hole into which a conductor can be inserted. This threaded end can be used in both connecting and removing cable fittings.

It is, therefore, an object of the present invention to provide a tool for working with electrical wiring and electrical cable.

A further object of the present invention is the provision of such a tool which can be used for working with coaxial cable.

Another object of the present invention is the provision of such a tool which can be used to perform a plurality of the customary operations which are performed on wiring and cable.

Another object of the present invention is the provision of such a tool which combines into one tool all the necessary elements normally required when gripping, cutting, stripping, crimping, decrimping, and bending operations are performed in working with electrical wire or cable.

Still a further object of the present invention is the provision of such a tool which can be used in performing the following operations on coaxial cable: removing interior jackets; removing dielectrics; and pushing, tightening, loosening, and removing cable connectors.

Other and further objects, features, and advantages will be apparent from the following description of the presently preferred embodiment of the invention, given for the purpose of disclosure and taken in conjunction with the accompanying drawings.

DESCRIPTION OF THE DRAWINGS

In the drawings forming a part of the disclosure herein, FIG. 1 is an elevational view of the tool of the present invention with the handle levers and jaws fully closed.

FIG. 2 is a view in side elevation of the tool of FIG. 1,

FIG. 3 is an elevational view of the tool of the present invention with the handle levers and jaws fully closed depicting the side opposite from the side depicted in FIG. 1, FIG. 4 is a fragmentary side elevation view in partial cross section of the jaw portion of the tool showing a comparison between the width of a particular portion of the tool and a length of cable jacketing, FIG. 5 is a fragmentary side elevation view in partial cross section of the jaw portion of the tool of FIG. 1 showing a comparison between the width of a particular section of the tool and a length of the center conductor of a cable, FIG. 6 is a fragmentary elevational view in partial cut away showing the threaded end handle of the tool inserted into a cable connector to be applied to an end of a cable, also depicting a comparison between one dimension of the connector and one dimension of the cable jacketing, FIG. 7 is a fragmentary side elevation view in partial cross section showing the tool in use for crimping a connector about a cable, and FIG. 8 is a fragmentary side elevation view showing the wrench-like handle end in place on a connector for tightening or loosening the connector.

DESCRIPTION OF THE PREFERRED EMBODIMENT

Referring now to the drawings, the tool of the present invention is represented generally by the reference 10. In FIGS. 1 and 3 the tool 10 includes first member 6 pivotally connected to second member 8 by pivot 32. First member 6 has jaw 14 formed of one end, mid portion 50, and handle 34 formed of the other end. Second member 8 has jaw 12 formed of one end, mid portion 52, and handle 36 formed of the other end. Jaw 14 has recess 54, said recess 54 having indented cutting element 18, indented cutting element 22, and cutting edge 19. The mid portion 50 of first member 6 has hole 48 through which pivot 32 is inserted. Crimping element 24 and decrimping element 26 are formed of mid portion 50. Handle 34 of first member 6 extends from mid portion 50 and has connector element 40 formed integrally of its end. Connector element 40 has threads 42 for mating with, for example, the threads of a connector such as conncector 80 in FIG. 6 and recess 44. In use, threads 42 mate with the female end of a suitable connector and recess 44 may receive a wire, conductor, or other appropriate object so that the centering, holding, pushing, or applying a connector may be facilitated.

Jaw 12 has recess 56, said recess 56 having indented cutting element 16, indented cutting element 20, and cutting edge 17. The mid portion 52 of second member 8 has hole 46 through which pivot 32 is inserted. Crimping element 28 and decrimping element 30 are formed of mid portion 52. Handle 36 of second member 8 extends from mid portion 52 and has wrench apparatus 38 formed integrally of its end. Wrench apparatus 38 is a conventional open-end wrench which can be used to tighten or loosen a nut or a connector.

Acting in combination, the cutting edges 17 and 19 may be used for severing wire, jacketing, sheathing, or cable. Acting in combination, the indented cutting elements 16 and 18 may be used for cutting operations, for stripping operations, and for removing the dielectric or center conductor (such as conductor 93 in FIG. 5) of a coaxial cable. Acting in combination, the indented cutting elements 20 and 22 may be used for cutting operations, for stripping operations, and for removing the outer jacket (such as outer jacket 84 in FIG. 4) from the center conductor of a coaxial cable. As indicated in FIG. 2, the widths at various points on the jaw portion of the tool 10 will be specific widths which will be known to the user of the tool 10. This will be extremely helpful in operations involving the connection of connectors to coaxial cables because, in performing a connection correctly, it is necessary to work with prescribed lengths of center conductors and outer jackets. The width A in FIG. 2 can be specific for gauging the length of a center conductor. The width B of FIG. 2 can be specific for gauging the length of outer jacket. These widths are also indicted in FIGS. 4 and 5. In FIG. 4, width B of the tool 10 corresponds to length B of outer jacket 84 of cable 82. In FIG. 5 width A of tool 10 corresponds to length A of center conductor 93 of cable 83. By integrating this measurement feature into the tool itself, a number of steps involved in the connecting of coaxial cable are eliminated and the use of a number of other tools is also eliminated.

FIG. 6 shows connector element 40 with connector 80 having female threads (not shown) screwed onto threads 42. As indicated in FIG. 6, center conductor 82 of cable 90 is insertable into recess 44 (FIG. 3) of connector element 40 to maintain center conductor 92 in a centered position thereby facilitating the application of the connector 80 to the cable 90.

FIG. 7 shows connector 80 already in place on cable 90 and crimping elements 24 and 28 (FIG. 3) of tool 10 in position around connector 80 to crimp connector 80 so that it is secured to cable 90. The closing together of handles 34 and 36, shown in FIGS. 1 and 3 will bring crimping elements 24 and 28 to bear on connector 80 thereby effectively crimping connector 80.

FIG. 8 shows the loosening and tightening function of wrench apparatus 38. As shown in FIG. 8, wrench apparatus 38 can be used to loosen or tighten a connector 81 of a cable 91 to a fixture 95.

The tool 10 can be used effectively and efficiently with a wide variety of electrical wires and cables. It is also very well suited for use with coaxial cable. For example, a tool 10 according to the present invention can be so fashioned as to be useful with RG-59/U coaxial cable. Fashioning a tool for use with a specific type of coaxial cable would require that the stripping elements, removing elements, crimping elements, decrimping elements, wrench apparatus, connector elements, and the width of various portions of the tool itself meet specific dimension requirements.

As shown in FIGS. 1, 3, and 7, the crimping elements 24 and 28 are shaped so that material crimped between them is pushed outwardly into recesses 62 and 63 rather than indented. This is an important result in working with coaxial cable. The crimping accomplished with prior art tools is generally of an indentation type such as that taught by U.S. Pat. Nos. 3,654,647; 3,967,905; and 3,733,626. Such indentation crimping cannot be used on coaxial cable or on a fitting for coaxial cable because it smashes the fitting into the dialectric thereby damaging the cable and adversely altering the cable's impedance. Also such indentation crimping can damage or penetrate sheathing or insulation causing the emission of radiation from the cable. By using the crimping elements 24 and 28, coaxial cable fittings can be installed on coaxial cable without these adverse effects. The crimping elements 24 and 28 are so shaped so that the objects to be crimped are received in recess 61 and crimped material is pushed outward into the recesses 62 and 63. The decrimping elements 26 and 30 coact to decrimp the protruding crimped material.

The present invention, therefore, is well adapted to carry out the objects and attain the ends and advantages mentioned, as well as others inherent therein. While presently preferred embodiments of the invention have been given for the purpose of disclosure, numerous changes in the details of construction, the combination, shape, size and arrangement of parts may be resorted to without departing from the spirit and scope of the invention.

What is claimed is:

1. A hand tool for working with a coaxial cable and a connector for the cable, said cable having a center conductor, an inner jacketing covering the center conductor, and an outer cover over the inner jacket, the tool comprising:

a first member and a second member, said first member being pivotally connected to said second member by a pivot means,
said first member having formed integrally thereof
a first jaw having formed integrally thereof
a recess for receiving the wire or cable to be worked with,
a cutting edge, and
a plurality of indented cutting elements,
a first mid-portion having
a crimping element formed integrally thereof,
a decrimping element formed integrally thereof, and
a hole for receiving the pivot means,
a first handle having formed integrally thereof a connector element for facilitating the loosening connecting and handling of connectors, said connector element having
threads formed integrally exteriorly thereof and
a recess therein for receiving, holding, and centering a wire, conductor, or dielectric, of the coaxial cable,
said second member having formed integrally thereof
a second jaw, having formed integrally thereof
a recess for receiving the wire or cable to be worked with, said recess being substantially similar to and substantially aligned with the recess of the first jaw, a cutting edge substantially similar to and substantially aligned with the cutting edge of the first jaw, said cutting edges aligned so that they coact when the first handle and a second handle formed integrally of the second member are pressed together to cut an object placed between them, a plurality of cutting elements, each substantially similar to and substantially aligned with one of the plurality of indented cutting elements of the first jaw, said indented cutting elements aligned so that they coact when the first handle and the second handle are pressed together to cut an object placed between them, a second mid-portion having a crimping element formed integrally thereof, said crimping element being substantially similar to and substantially aligned with the crimping element of the first mid-portion, said crimping elements coacting when the first and second handles are pressed together to form a first recess for receiving the coaxial cable and the connector which is to be connected to the cable and said crimping elements coacting to form a second and third recess each communicating with the first recess so that material crimped between the crimping elements is pushed outwardly into the second and third recesses, a decrimping element formed integrally thereof, said decrimping element being substantially similar to and substantially aligned with the decrimping element of the first mid-portion, so that said decrimping elements coact when the first and second handles are pressed together to decrimp an object placed between them, a hole for receiving the pivot means, said hole substantially similar to and substantially aligned with the hole of the first mid-portion, the second handle having formed integrally thereof an open-end wrench apparatus for releasably tightening and loosening nuts and connectors and the jaws of the tool having a first width substantially equal to the length of center conductor to be inserted into the connector and having a second width substantially equal to the length of outer cover to be removed from the cable to permit insertion of the cable into the connector.

2. A hand tool for working with coaxial cable, comprising:

a first member and a second member, said first member being pivotally connected to said second member by a pivot means, said first member having formed integrally thereof,
a first jaw
a first mid portion, and
a first handle, said jaw having formed integrally thereof
a first recess for receiving the wire or cable to be worked with,
a first cutting edge, and
a first indented cutting element, said first mid portion having
a first crimping element formed integrally thereof,
a first decrimping element formed integrally thereof, and
a first hole for receiving the pivot means, said first handle having formed integrally thereof a connector element for facilitating the loosening and handling of connectors, said connector element having threads formed integrally thereof and a recess therein for receiving, holding, and centering a wire, conductor, or dielectric, said second member having formed integrally thereof
a second jaw,
a second mid portion, and
a second handle said second jaw having formed integrally thereof
a second recess for receiving the wire or cable to be worked with, said recess being substantially similar to and substantially aligned with the first recess
a second cutting edge substantially similar to and substantially aligned with the first cutting edge, said cutting edges aligned so that they coact when handles are pressed together to cut an object placed between them,
a second indented cutting element substantially similar to and substantially aligned with the first indented cutting element, said indented cutting elements aligned so that they coact when the handles are pressed together to cut an object placed between them, said second mid portion having
a second crimping element formed integrally thereof, said second crimping element being substantially similar to and substantially aligned with the first crimping element so that said crimping elements coact when the handles are pressed together to form a non-indenting crimp on an object placed between them,
a second decrimping element formed integrally thereof, said decrimping element being substantially similar to and substantially aligned with the first decrimping element so that said decrimping elements coact when the handles are pressed together to decrimp an object placed between them,,
a second hole for receiving the pivot means, said second hole substantially similar to and substantially aligned with the first hole, said second handle having formed integrally
thereof a wrench apparatus for tightening and loosening nuts and connectors.

* * * * *